(12) United States Patent
Jung

(10) Patent No.: US 10,905,947 B2
(45) Date of Patent: Feb. 2, 2021

(54) METHOD FOR TOUCH CONTROL IN MOBILE REAL-TIME SIMULATION GAME

(71) Applicant: Sang Mun Jung, Chungju-si (KR)

(72) Inventor: Sang Mun Jung, Chungju-si (KR)

( * ) Notice: Subject to any disclaimer, the term of this patent is extended or adjusted under 35 U.S.C. 154(b) by 68 days.

(21) Appl. No.: 16/084,825

(22) PCT Filed: Sep. 7, 2016

(86) PCT No.: PCT/KR2016/010008
§ 371 (c)(1),
(2) Date: Sep. 13, 2018

(87) PCT Pub. No.: WO2018/004061
PCT Pub. Date: Jan. 4, 2018

(65) Prior Publication Data
US 2019/0105559 A1   Apr. 11, 2019

(30) Foreign Application Priority Data

Jun. 29, 2016  (KR) .......................... 10-2016-0081783
Jun. 29, 2016  (KR) .......................... 10-2016-0081788

(51) Int. Cl.
*A63F 13/2145* (2014.01)
*A63F 13/20* (2014.01)
(Continued)

(52) U.S. Cl.
CPC .......... *A63F 13/2145* (2014.09); *A63F 13/20* (2014.09); *A63F 13/44* (2014.09);
(Continued)

(58) Field of Classification Search
CPC ...... A63F 13/2145; A63F 13/20; A63F 13/65; A63F 13/45; A63F 13/44; A63F 13/213;
(Continued)

(56) References Cited

U.S. PATENT DOCUMENTS

2015/0072784 A1*  3/2015  Lee ................................ 463/31

FOREIGN PATENT DOCUMENTS

| JP | 2005-279165 | 10/2005 |
| KR | 10-2014-0135276 | 11/2014 |

(Continued)

OTHER PUBLICATIONS

International Search Report in PCT/KR2016/010008, dated Mar. 28, 2017.

*Primary Examiner* — Robert T Clarke, Jr.
(74) *Attorney, Agent, or Firm* — Akerman LLP

(57) ABSTRACT

The present invention relates to a method for touch control in a mobile real-time simulation game. Particularly, the present invention relates to a touch control method which can provide a function selected among predetermined functions according to the interval from when a touch has been input to when the next touch is input and the pattern type of input touch. A method for touch control in a simulation game performed using multiple units according to one aspect of the present invention may comprises: a first step for displaying the simulation game through a display unit; a second step for inputting a touch having a first pattern on at least a partial area of the display unit; a third step for inputting a touch having a predetermined function, using the interval between when the touch having the first pattern is input and when the touch having the second pattern is input and the pattern type of the input touch having the first pattern and the input touch having the second pattern.

9 Claims, 8 Drawing Sheets

(51) Int. Cl.
    *G06F 3/0482* (2013.01)
    *G06F 3/0488* (2013.01)
    *A63F 13/65* (2014.01)
    *A63F 13/45* (2014.01)
    *A63F 13/44* (2014.01)
    *A63F 13/213* (2014.01)
    *A63F 13/215* (2014.01)
    *A63F 13/26* (2014.01)
    *A63F 13/285* (2014.01)
    *A63F 13/426* (2014.01)
    *A63F 13/822* (2014.01)

(52) U.S. Cl.
    CPC .............. *A63F 13/45* (2014.09); *A63F 13/65* (2014.09); *G06F 3/0482* (2013.01); *G06F 3/04883* (2013.01); *A63F 13/213* (2014.09); *A63F 13/215* (2014.09); *A63F 13/26* (2014.09); *A63F 13/285* (2014.09); *A63F 2300/1075* (2013.01); *A63F 2300/1081* (2013.01); *A63F 2300/1093* (2013.01); *A63F 2300/301* (2013.01); *A63F 2300/302* (2013.01); *A63F 2300/405* (2013.01); *A63F 2300/638* (2013.01); *A63F 2300/69* (2013.01)

(58) Field of Classification Search
    CPC ...... A63F 13/215; A63F 13/26; A63F 13/285; A63F 13/426; A63F 13/822; A63F 2300/1075; A63F 2300/1081; A63F 2300/1093; A63F 2300/301; A63F 2300/302; A63F 2300/405; A63F 2300/638; A63F 2300/59; G06F 3/0482; G06F 3/04883
    See application file for complete search history.

(56) References Cited

FOREIGN PATENT DOCUMENTS

| | | |
|---|---|---|
| KR | 10-2015-0100236 | 9/2015 |
| KR | 10-2016-0058322 | 5/2016 |
| WO | 2013/183836 | 12/2013 |

\* cited by examiner

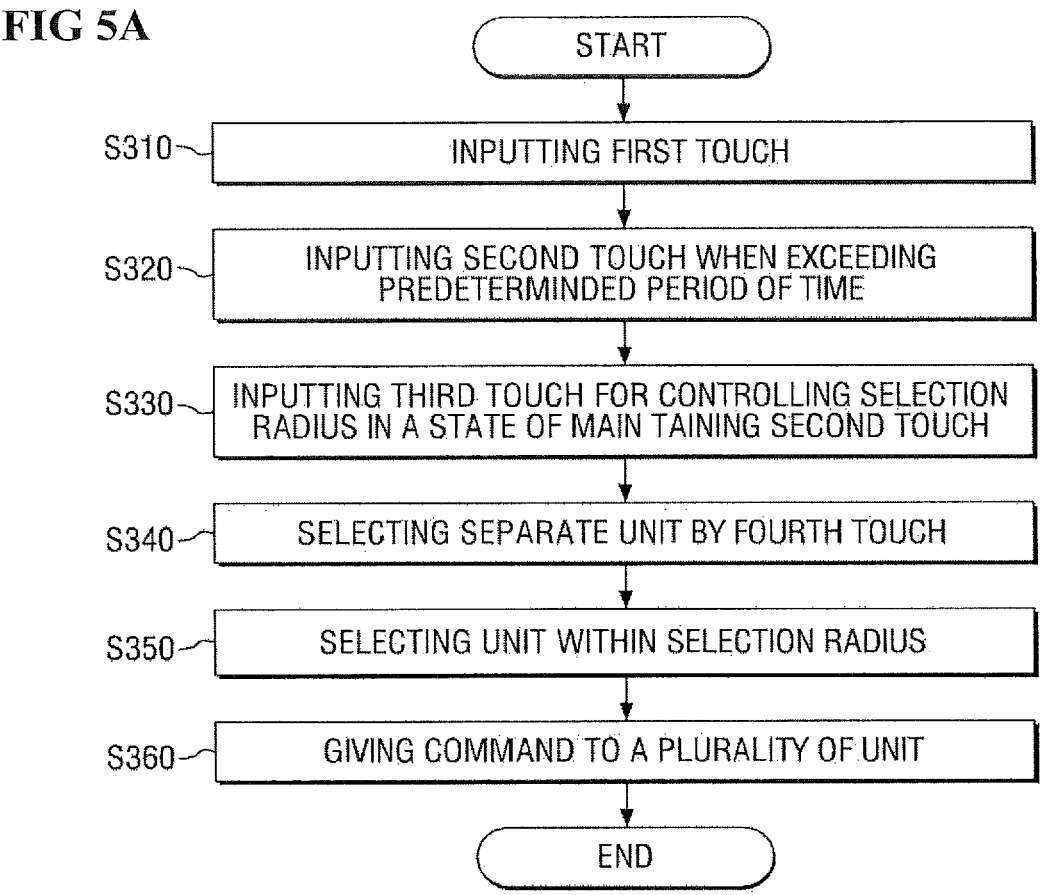
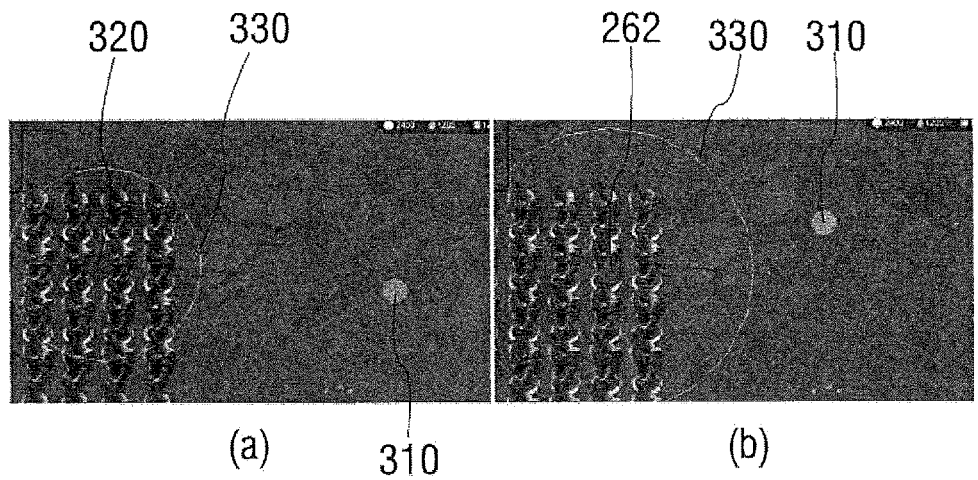

METHOD FOR TOUCH CONTROL IN MOBILE REAL-TIME SIMULATION GAME

This application is a national phase of PCT/KR2016/010008, filed Sep. 7, 2016, and claims priority to KR 10-2016-0081783 filed June 29, 2016 and KR 10-2016-0081788 filed June 29, 2016, the entire contents of both of which are hereby incorporated by reference.

BACKGROUND

Technical Field

The present invention relates to a method for touch control in a mobile real-time simulation game. Particularly, the present invention relates to a touch control method which may provide a user with a function selected among predetermined functions according to the interval from when a touch has been input to when the next touch is input and the pattern type of input touch.

Description of the Related Art

Terminals such as personal computers, laptops, mobile phone may be configured to perform various functions. Such a variety of functions includes a data and voice communication function, a function for shooting pictures and videos with a camera, an audio recording function, a playback function of music files with a speaker system, a function for displaying images or videos, etc., as examples. Some terminals may further include additional functions which may run a game. The other terminals may be implemented as multimedia devices. Further, recent terminals may receive broadcast or multicast signals, allowing users to watch videos or television programs.

Commonly, the terminal may be categorized as a mobile/portable terminal and a stationary terminal. In particular, the mobile/portable terminal may be categorized as a handheld terminal and a vehicle mount terminal depending on user's direct portability.

As like the above, such a terminal may be implemented as a multimedia player having multiple functions, for example, a function for shooting pictures and videos, an audio recording function, a playback function of music and video files, a function for running games and a function for receiving broadcasts.

In order to support and enhance functions of such a terminal, it may be considered to improve the structural part of and/or the software part of the terminal.

Real-time simulation (RTS) refers to a simulation of processing during the same time as the real situation takes. Such a Real-time simulation (RTS) may be implemented by the aforementioned terminal.

When processing data using a terminal, there is an operation to control the necessary time for processing, the time at which data is generated, etc. Thus, when performing a simulation on such an operation, it is required to perform a simulation under the same time as the real situation and it is called as Real-time simulation (RTS).

The Real-time simulation (RTS) includes a Real-time strategy (RTS) game, etc., as a typical example, and a user may enjoy the Real-time strategy (RTS) game via the terminal.

The Real-time strategy (RTS) game commonly complies with a strategy game in which a participant collects resources and builds a building or produces troops by using the collected resources and which is over when a civilization will be developed or the participant win a war.

In addition, since the Real-time strategy (RTS) is proceeded in real time, nimble fingers and good judgement may effect on the outcome greatly. Accordingly, such a Real-time strategy (RTS) game is characterized by using mouse manipulation, such as mouse click or drag much more than other games.

In Korea, the game "StarCraft" won popularity nationwide and consequently the Real-time strategy (RTS) game has become the most popular game genres.

Currently, users enjoy a Real-time strategy simulation game via not stationary terminals but any other terminals which allows portability.

However, it is difficult for a user to control actions, such as collecting of resources, building of a building or producing of troops by using the collected resources, developing of a civilization, winning of a war, etc., via not an input part, such as a keyboard, but a touch screen which has a comparatively small size.

Therefore, it is required to solve such a problem.

SUMMARY OF THE INVENTION

The present invention relates to a method for touch control in a mobile real-time simulation game.

In particular, the present invention relates to a touch control method which may provide a user with a function selected among predetermined functions according to the interval from when a touch has been input to when the next touch is input and the pattern type of input touch.

Meanwhile, the present invention is not limited to the above-mentioned technical problems, and unless specifically stated otherwise herein, other technical problems will be clearly understood by those of ordinary skilled in the art from the following description.

According to one aspect of the present invention, a touch control method in a simulation game using a plurality of units may include steps of: displaying the simulation game on a display unit (S1); inputting a touch of a first pattern into at least a portion of the display unit (S2); inputting a touch of a second pattern into at least a portion of the display unit (S3); and providing predetermined functions using the interval between the touch input of the first pattern and the touch input of the second pattern and the touch pattern types of the touch input of the first pattern and the touch input of the second pattern (S4).

According another aspect of the present invention, the touch input of the first pattern and the touch pattern of the second pattern may include a long touch input, a short touch input and a double touch input.

According another aspect of the present invention, if the interval is within a predetermined period of time, a specific area of a game screen displayed on the display unit may be either enlarged or reduced at step S4.

According another aspect of the present invention, if the interval exceeds a predetermined period of time and one unit is designated among the plurality of units by the touch input of the second pattern, any one unit among the plurality of units may be selected from the game screen displayed on the display unit at step S4.

According another aspect of the present invention, the interval exceeds a predetermined period of time, and step S4 further may include steps of: inputting a touch of a third pattern, so as to designate a range of selection in a state of maintaining the touch input of the second pattern (S4-1); and selecting all units present within the range of selection among the plurality of units (S4-2).

According another aspect of the present invention, the touch input of the third pattern may a touch-and-drag.

According another aspect of the present invention, the interval exceeds the predetermined period of time, the touch input of second pattern may be input into an area without the plurality of units in the game screen displayed on the display unit, and all units present in the displayed game screen may be selected among the plurality of units at step S4.

According another aspect of the present invention, the interval exceeds the predetermined period of time, any one unit may be designated among the plurality of units by the touch input of the second pattern, and all units which are the same type as the any one unit may be selected among the plurality of units from the game screen displayed on the display unit at step S4.

According another aspect of the present invention, the touch control method in a simulation game may further include step of: designating a first group which includes at least one of the plurality of units, in advance prior to step S 1 (S 0.5), wherein the interval exceeds a predetermined period of time, the touch of the second pattern may be input into a menu for selecting a troop, and the first group may be selected as a specific troop at step S4.

According another aspect of the present invention, the touch control method in a simulation game may further include step of moving to a first screen in the game screen displayed on the display unit in advance prior to step S 1 (S 0.5), wherein the interval exceeds a predetermined period of time, the touch of the second pattern may be input into the menu for selecting a troop, and the first screen may be selected as a designated screen at step S4.

According another aspect of the present invention, the simulation game is performed by using at least one between a local area communication and telecommunication, wherein the local area communication includes technologies of Bluetooth, Radio Frequency Identification (RFID), Infrared Data Association (IrDA), Ultra Wideband (UWB), Zig-Bee, and Wireless Fidelity (Wi-Fi), and the telecommunication includes technologies of Code division multiple Access (CDMA), Frequency division multiple access (FDMA), Time Division Multiple Access (TDMA), Orthogonal Frequency Division Multiple Access (OFDMA) and Single Carrier Frequency division Multiple Access (SC-FDMA).

The present invention is capable of providing a user with a touch control method in a simulation game.

In particular, the present invention is capable of providing a user with a function selected among predetermined functions according to the interval from when a touch has been input to when the next touch is input and the pattern type of input touch.

Meanwhile, effects of the present invention are not limited to the aforementioned effects, and other effects not covered herein will be clearly understood by those of ordinary skilled in the art from the following description.

BRIEF DESCRIPTION OF THE DRAWINGS

FIG. 5A is a flowchart showing a procedure for selecting a plurality of units, according to the present invention, FIG. 5B shows a procedure for selecting a plurality of units and FIG. 5C is a specific example of a procedure for positioning and canceling a unit.

DETAILED DESCRIPTION OF THE EMBODIMENTS

It cannot be concluded that all elements described in embodiments of the present invention are essential, unless otherwise, unless the embodiments restrict the inventions claimed in this application unduly.

Hereinafter, a mobile/portable terminal according to the present invention will be described in detail.

A mobile/portable terminal or a handheld described in the present invention may include a handheld mobile phone, a smart phone, a laptop computer, a digital broadcast terminal, Personal Digital Assistance (PDF), Portable Multimedia Player (PMP), a navigation, etc. However, if excluding a case which is capable of being applied to only handheld terminal, those of ordinary skilled in the art. may understand that elements according to embodiments described in the present invention may be applied to a stationary terminal, such as a digital television, a desktop computer, etc.

Figure 1:
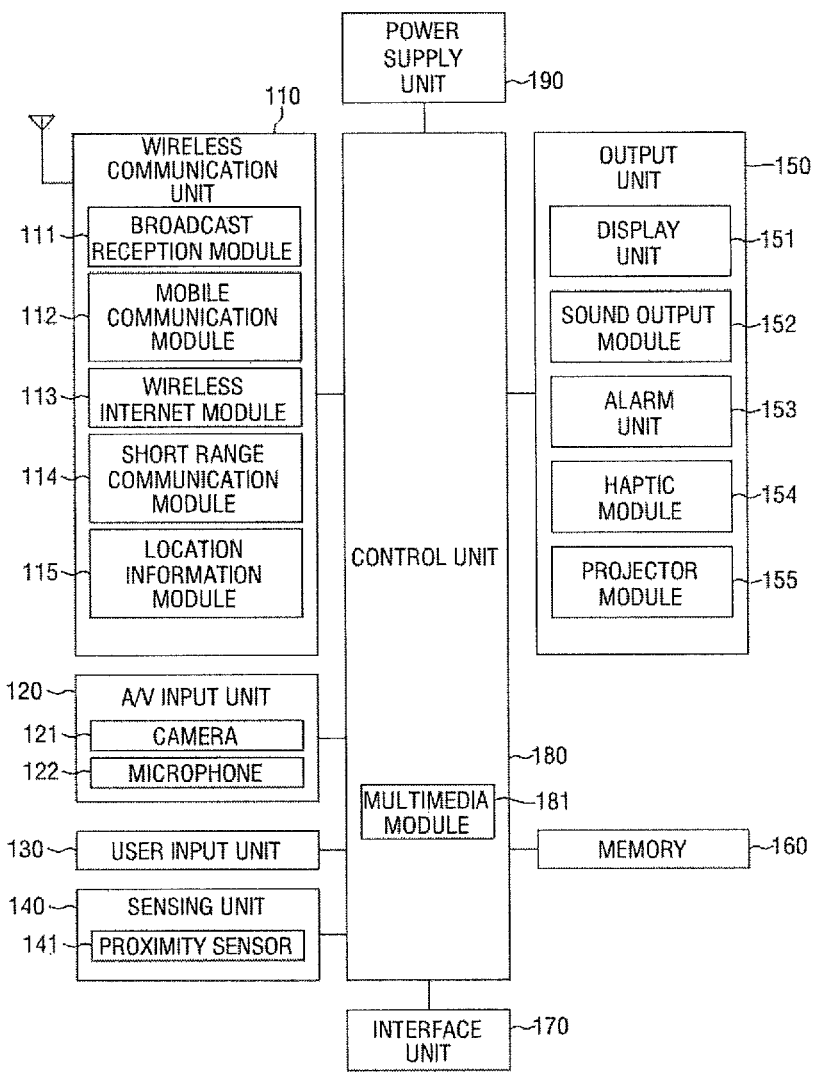
FIG. 1 shows an example of a terminal which is capable of being applied to the present invention.

FIG. 1 shows an example of a terminal which is capable of being applied to the present invention.

The terminal may include a wireless communication unit 110, Audio/Video (A/V) input unit 120, a user input unit 130, a sensing unit 140, an output unit 150, a memory 160, an interface unit 170, a control unit 180 and a power supply unit 190, etc. Since configurational elements illustrated in FIG. 1 are not necessary, it may be implemented as a terminal including more or less configurational elements than the preceding.

Hereinafter, the configurational elements are described one by one.

The wireless communication unit 100 may include one or more module which allows wireless communication either between a terminal and a wireless communication system or between a terminal and a network where a terminal is positioned. For example, the wireless communication unit 100 may include a broadcast receipt module 111, a mobile communication module 112, a wireless internet module 113, short range communication module 114 and a location information module 115, etc.

The broadcast receipt module 111 may receive a broadcast signal and/or broadcast-related information from an external broadcast management server via a broadcast channel.

The broadcast channel may include a satellite channel and a terrestrial channel. The broadcast management server may be either a server which generates a broadcast signal and/or broadcast-related information, allowing transmission or a server which receives pregenerated broadcast signal and/or broadcast-related information, allowing transmitting to a terminal. The broadcast signal may include a TV broadcast signal, a radio broadcast signal, data a broadcast signal and any other a broadcast signal in which a data broadcast signal is coupled to a TV broadcast signal or a radio broadcast signal.

The broadcast-related information may include information for a broadcast channel, a broadcast program or a broadcast service provider. The broadcast-related information may be provided through a mobile communication network. In such as case, the broadcast-related information may be received by the mobile communication module 112.

The broadcast-related information may be present in various types, for example, Electronic program Guide (EPG) of Digital Multimedia broadcasting (DMB), or Electronic Service Guide (ESG) of Digital Video Broadcast-handheld (DVB-H).

The broadcast receipt module 111 may receive a digital broadcast signal by using a digital broadcast system, for example, Digital Multimedia Broadcasting-Terrestrial (DMB-T), Digital Multimedia broadcasting-Satellite (DMB-S), Digital Video Broadcast-Handheld (DVB-H), Integrated Services Digital Broadcast-Terrestrial (ISDB-T), etc. Of course the broadcast receipt module 111 may be configured to be suitable for the above-described digital broadcast system and any other broadcast systems.

The broadcast signal and/or the broadcast-related information received via the through the broadcast receipt module 111 may be stored in the memory 160.

The mobile communication module 112 may transmit-receive a wireless signal with at least one of a base station, an external terminal and a server on a mobile communication network. The wireless signal may include various type of data according to transmission-receipt of a voice call signal, a video communication call signal or a text/multimedia message.

The internet module 113 may refer to a module for wireless internet access and may be built-in or external to the terminal. Wireless LAN (WLAN) (Wi-Fi), Wibeo (Wireless broadband), World Interoperablity for Microwave Access (Wimax), High Speed Downlink Packet Access (HSDPA), etc. may be used as a wireless internet technology.

The short range communication module 114 may refer to a module for short range communication. Bluetooth, Radio Frequency Identification (RFID), Infrared Data Association (IrDA), Ultra Wideband (UWB), ZigBee, and Wireless Fidelity (Wi-Fi), etc. may be used as a short range communication technology.

The location information module 115 may refer to a module for obtaining a location of a terminal and a Global position System (GPS) may be a typical example.

Referring to FIG. 1, the Audio/Video (A/V) input unit 120 may allow inputting an audio signal or a video signal, and may include a camera 121, a microphone 122 etc. The camera 121 may process a video frame, such as an image and a video, obtained by an image sensor, in a video call mode or a photographing mode. The processed video frame may be displayed on a display unit 151.

The video frame processed in the camera 121 may be stored in the memory 160 or transmitted to the outside through the wireless communication unit 110. Two or more cameras 121 may be provided according to a using environment.

The microphone 122 may process an external sound signal input by a microphone in a call mode or a recording mode, voice recognition mode, etc., to electrical voice. If a terminal is in the call mode, the processed voice data may be converted into a form transmittable to the base station through mobile communication module 112, allowing to be output. The microphone 122 may be provided with various noise removal algorithms, allowing removing noises generated when an external sound signal is input.

The user input unit 130 may generate input data for controlling a terminal action by a user. The user input unit 130 may be composed of a key pad, a dome switch, a touch pad (static pressure/static electricity), a jog wheel, a jog switch, etc.

The sensing unit 140 may sense a current state of a terminal, such as an opening/closing state, a terminal location, a user's access, a terminal orientation, acceleration/deceleration of the terminal, allowing generating a sensing signal for control a terminal action. For example, if a terminal is a slide type of phone, it is possible to sense whether the slide type of phone is opened or not. Further, the power supply unit 190 may sense a power supplying state, a connection state of the interface unit 170 with external devices, etc. Meanwhile, the sensing unit 140 may include a proximity sensor 141.

The output unit 150 may allow generating an output related to visual, auditory or tactile sensors, and may include the display unit 151, a sound output module 152, an alarm unit 153, a haptic module 154, a projector module 155, etc.

The display unit 151 may display (output) information processed in a terminal. For example, if a terminal is in the call mode, such a display unit may display a User Interface (UI) or Graphic User Interface (GUI) related to a call. If the terminal is in the video call mode or photographing mode, such a display unit may display photographed and/or received images or UI, UGI.

The display unit 151 may include at least one of a liquid crystal display (LCD), a thin film transistor-liquid crystal display (TFT LCD), an organic light-emitting diode (OLED), a flexible display, and a 3D display.

Some of these displays may be configured as a transparent type or a light transmission type, allowing seeing the outside therethrough. Such displays may be named as a transparent display and a Transparent OLED (TOLED) is a typical example of such a transparent display. A rear structure of the display unit 151 may be also configured as light transmission type. A user may see an object positioned in the rear of a terminal through an area which the display unit 151 of a terminal body occupies, by such a structure.

Two or more display units 151 may be provided according to an implementation type of a terminal. For example, a plurality of display units may be spaced apart or may be disposed in one body, on one face. Such a plurality of display units may be also disposed on different faces, respectively.

When the display unit 151 and a sensor (hereinafter, referred to as 'touch sensor') for sensing a touch action form a mutually layered structure (hereinafter referred to as 'touch screen'), the display unit 151 may be used as an output device as well as an input device. The touch sensor, for example, may have a type of a touch film, a touch sheet, a touch pad, etc.

The touch sensor may be configured to convert a pressure applied to a specific portion of the display unit 151 or a change, such as electrostatic capacitance, etc., occurring in a specific portion of the display unit 151 into an electrical input signal. The touch sensor may be configured to detect a position and an area to be touched as well as a pressure when touched.

If there is a touch input to the touch sensor, a signal(s) corresponding thereto may be sent to a touch control unit. The touch control unit may process the signal(s) and then transmits the data corresponding thereto to a control unit 180. Hereby, the control unit 180 may recognize what area of the display unit 151 is touched.

The proximity sensor 141 may be disposed an interior area of a terminal surrounded with the touch screen or near to the touch screen. The proximity sensor refers to a sensor which may detect an object approaching to a predetermined detection face, or an object present nearby by using the power of electromagnetic field or infrared rays without a mechanical contact. The proximity sensor has longer lifespan than that of a contact sensor and is excellent in the utilization thereof.

The proximity sensor may include a transmission type photoelectric sensor, a direct reflection type photoelectric sensor, a mirror reflection type photoelectric sensor, a high frequency oscillation type proximity sensor, a capacitance type proximity sensor, a magnetic proximity sensor, an infrared proximity sensor, etc. If the touch screen is a capacitance type, such a touch screen may be configured to detect a pointer's approaching by a change in the magnetic field according to the pointer's approaching. In this case, the touch screen (touch sensor) may be classified as a proximity sensor.

Hereinafter, for convenience of description, such an action recognizing that the pointer is placed on the touch screen as approaching without contact of the pointer with the touch screen may be called as "proximity touch". In addition, an action that the pointer is contacted therewith in practice may be called as "contact touch". A proximity touch position may refer to a position to which the pointer vertically corresponds to the touch screen when the pointer is proximity-touched.

The proximity sensor may detect a proximity touch and a proximity touch pattern (e.g. a proximity touch distance, a proximity touch direction, a proximity touch time, a proximity touch position, a proximity touch movement, etc.). The detected proximity touch action and information corresponding to the proximity touch pattern may be output on the touch screen.

The sound output module 152 may output audio data which is received from the wireless communication unit 110 in call signal receipt, call or recording mode, voice recognition mode, broadcast receipt mode, etc., or which is stored in the memory 160. The sound output module 152 may output a sound signal related to functions (e.g. call signal sound, message sound, etc.) to be performed in the terminal. Such a sound output module 152 may include a receiver, a speaker, a buzzer, etc.

The alarm unit 153 may output a signal, allowing informing of the occurrence of an event. The event occurred in the terminal may include a call signal receipt, a message receipt, a key signal input, a touch input, etc. The alarm unit 153 may output any other type of a signal, for example a vibration, besides a video signal or an audio signal, allowing the occurrence of an event. The video signal or the audio signal may output through either the display unit 151 or the sound output module 152, allowing classifying such these display unit and the sound output module (151 and 152) as a portion of the alarm unit 153.

The haptic module 154 may generates a variety of tactile effects which a user may feel. The tactile effect generated from the haptic module 154 may include a vibration as a typical example. The strength and patterns of the vibration generated from the haptic module 154 are controllable. For example, such vibration may be output by composing different vibrations or sequentially.

The haptic module 154 may generate a variety of tactile effects, such as a pin arrangement performing a vertical movement against the cutaneous surface which comes in contact, an inhalation force or an exhalation force of air through an inhalation hole or an exhalation hole, respectively, brushing past the cutaneous surface, a contact of the electrode, an effect by the stimulation of an electrostatic force, a representation of the cool and warm feeling by using a thermoelectric element, etc.

The haptic module 154 may transfer a tactile effect through direct contact. In addition, such a haptic module may be implemented allowing a user to feel the tactile effect through the muscular sense of a finger or an arm.

The projector module 155 is a configurational element for performing an image projection function using the terminal, and may display an image which is the same as or at least a portion of which is different from an image displayed on the display unit 151, on an external screen or a wall.

In particular, the projector module 155 may include a light source (not illustrated) which generates a light (as one example, a laser light) for outputting an image to the outside, an image generating means (not illustrated) for generating an image to be output to the outside by using the light generated by such a light source, a lens (not illustrated) for enlarging the image at a predetermined focal length and then outputting such an enlarged image to the outside. Further, the projector module 155 may include a device (not illustrated) which controls a direction of the projected image by mechanically moving the lens or the entire module.

The projector module 155 may be classified into a Cathode Ray Tube (CRT) module, a Liquid Crystal Display (LCD) module and a Digital Light Processing (DLP) module according to an element of the display means. Specifically, the DLP module enlarges and projects an image which generated by reflecting the light generated from the light source to a Digital Micromirror Device (DMD) chip. Thus, such a DLP module is advantageous in miniaturizing of the projector module 151.

Preferably, the projector module 155 may formed along a longitudinal direction on the side, front and rear of the terminal. Of course, it is obvious that the projector module 155 may be formed on any other positions of the terminal, if necessary.

The memory unit 160 may allow a program for processing and controlling the control unit 180 being stored and to perform a function for temporarily storing input/output data (e.g. a telephone directory, a message, an audio, a picture, a video, etc.). The memory unit 160 may allow storing the frequency in use of the respective data (e.g. frequency in use of each of telephone numbers, messages and multimedia) together.

The memory unit 160 may include at least one of a flash memory type, a hard disk type, a multimedia card micro type, a card memory (e.g. SD or XD memory, etc.), a Random Access memory (RAM), a Static Random Access Memory (SRAM), a Read-only Memory (ROM), an Electrically Erasable programmable Read-Only Memory (EE- PROM), a Programmable Read-Only Memory (PROM), a magnetic memory, a magnetic disc and an optical disc. The terminal may be operated related to a web storage which performs a storage function of the memory unit 160 on the internet.

The interface unit 170 may acts as a passage of all external devices coupled to the terminal. The interface unit 170 may receive data or be supplied with the power from the external devices, allowing transmission thereof to the respective configurational elements inside the terminal and transmission of the data inside the terminal to the external devices. For example, the interface unit 170 may include a wire/wireless headset port, an external charger, a wire/wireless data port, a memory card port, a coupling port of a device equipped with an identification module, an audio Input/Output (I/O) port, a video I/O port, an earphone port, etc.

The identify module is a chip which stores various kinds of information for identifying an authority to use the terminal. Such an identification module may include a User Identify Module (UIM), a Subscriber Identify Module (SIM), Universal Subscriber Identify Module (USIM), etc. A device equipped with the identify module (hereinafter referred to as an identify device) may be manufactured into a smart card type. Therefore, the identify device may be coupled with the terminal via a port.

When the mobile/portable terminal is coupled with an external cradle, the interface unit may be a passage for supplying the power from the cradle to the mobile/portable terminal or for transferring various kinds of command signals input from the cradle by a user to the mobile/portable terminal. The command signals or the power input from the cradle may be operated as a signal for recognizing that the mobile/portable terminal is accurately equipped to the cradle.

The controller 180 commonly controls the overall operation of the terminal. For example, such controller may perform the control and processing related to a voice call, a data communication and a video call. The controller 180 may be equipped with a multimedia module 181 for the playback of multimedia. The multimedia module 181 may be implemented inside the controller 180 or separately from the controller 180.

The controller 180 may perform pattern recognition processing, allowing recognizing a writing input or a drawing input on the touch screen as a character or an image, respectively.

The power supply unit 190 may be supplied with an external and an internal power by the control of the controller 180, allowing supplying power necessary for the operation of the respective configurational elements.

Various embodiments described herein may be implemented in, for example, recording media which may be readable by a computer or any other devices similar thereto, using software, hardware or the combination thereof.

According to the implementation of hardware, an embodiment described herein may be implemented by using at least one of electrical units for performing Application Specific Integrated Circuits (ASICs), Digital Signal Processors (DSPs), Digital Signal Processing Devices (DSPDs), Programmable Logic Devices (PLDs), Field Programmable Gate Armys (FPGAs), processors, controllers, micro-controllers, microprocessors and any other functions. In some cases, the embodiments described in this specification may be implemented as the controller 180 itself.

According to the implementation of software, embodiments, such as procedures and functions, described in this specification may be implemented as separate software modules. The respective software modules may perform one or more functions and operations described in this specification. Software codes may be implemented as software applications written in appropriate programming languages. The software codes may be stored in the memory 160 and performed by the controller 180.

Real-time simulation (RTS) in which it is controlled to build a building, to produce troops, to develop a civilization or to win a war means a simulation of processing during the same time as the real situation takes. Such a Real-time simulation (RTS) may be implemented by the aforementioned terminal.

When processing data using a terminal, there is an operation to control the necessary time for processing, the time at which data is generated, etc. Thus, when performing a simulation on such an operation, it is required to perform a simulation under the same time as the real situation and it is called as Real-time simulation (RTS).

The Real-time simulation (RTS) includes a Real-time strategy (RTS) game, etc., as a typical example, and a user may enjoy the Real-time strategy (RTS) game via the terminal.

The Real-time strategy (RTS) game commonly complies with a strategy game in which a participant collects resources and builds a building or produces troops by using the collected resources and which is over when a civilization will be developed or the participant win a war.

In addition, since the Real-time strategy (RTS) is proceeded in real time, nimble fingers and good judgement may effect on the outcome greatly. Accordingly, such a Real-time strategy (RTS) game is characterized by using mouse manipulation, such as mouse click or drag much more than other games.

In Korea, the game "StarCraft" won popularity nationwide and consequently the Real-time strategy (RTS) game has become the most popular game genres.

Currently, users enjoy a Real-time strategy simulation game via not stationary terminals but any other terminals which allows portability.

However, it is difficult for a user to control actions, such as collecting of resources, building of a building by using the collected resources via not an input part, such as a keyboard, but a touch screen which has a comparatively small size.

Therefore, the present invention intends to provide a method for touch control in a mobile real-time simulation game.

In particular, the present invention intends to provide a touch control method which may provide a user with a function selected among predetermined functions according to the interval from when a touch has been input to when the next touch is input and the pattern type of input touch.

Prior to the detailed description of the present invention, units and menus which are applicable to the present invention will be described.

As described above, the present invention may be applied to a mobile real-time simulation game, and a plurality of units or characters may be applied to such a game.

Further, an information menu for giving commands to the plurality of units or informing of user's status may be expressed additionally.

Figure 2A:
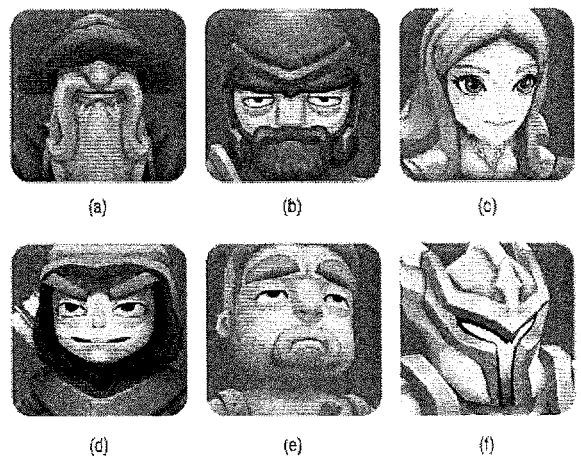
FIG. 2A shows an example of a plurality of units which are applicable to the present invention.
Figure 2B:
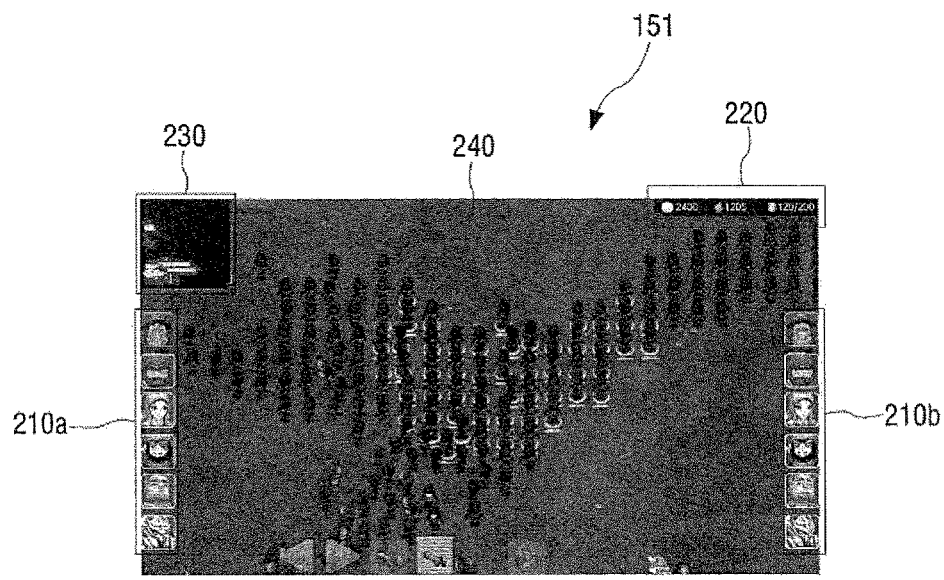
FIG. 2B shows a specific example in which a menu for explaining the respective functions of a game is displayed.

FIG. 2A shows an example of a plurality of units which are applicable to the present invention, and FIG. 2B shows a specific example in which a menu for explaining the respective functions of a game is displayed.

FIG. 2A to 2F show 6 specific examples of the plurality of units which are applicable to a game.

It is possible to set-up different capacities and conditions in the respective units. 6 kinds of the units provided in the present invention are merely examples and the game may be implemented through more or less kinds of units.

Further, FIG. 2B shows a specific example in which a menu for explaining the respective functions of a game is displayed.

Referring to FIG. 2, a troop selection menu for selecting a troop related to the respective units as described in FIG. 2A is illustrated in a game screen 240 of the display unit 151.

According to the present invention, a first troop selection menu 210a and a second troop selection menu 210b are provided, allowing easily applying user's both right and left fingers thereto. However, the present invention is not limited thereto.

Further, a guide map 230 may expressed in the entire map, allowing informing of a position of the unit currently operated by the user.

Further, a status menu 220 may be displayed additionally, allowing expressing each status of a plurality of resources which a user possesses currently.

Further, a plurality of functions may be applied by the aforementioned pointer.

For example, a short-touch method may be applied to a target position in regard to the movement of a unit.

Further, a long-touch method or a double-touch method may be applied to a target position, allowing the attack movement of the unit.

Further, a double-touch method may be applied to the troop selection menu 210, allowing screen movement of a troop unit.

Further, a double-touch method may be applied to the troop selection menu 210, allowing moving the screen to a screen designated region.

Hereinafter, methods for easily designating the units into a group and giving commands will be described in detail, based on the menus and the plurality of units described in FIGS. 2A and 2b.

According to the present invention, a method for touch control in a mobile real-time simulation game may provide a user with a function selected among predetermined functions according to the interval from when a touch has been input to when the next touch is input and the pattern type of input touch.

According to the present invention, a touch pattern applicable to the present invention may include a long touch, a short touch, a double touch, etc. For convenience, the present invention is described limiting the touch pattern to a long touch. However, the present invention is not limited to a long touch, a short touch, a double touch, etc.

According to the present invention, a short touch may mean a touch pattern within a predetermined time taken from touching a screen with a finger to removing the finger.

Further, according to the present invention, a long touch may mean a touch pattern exceeding a predetermined time taken from touching a screen with a finger to removing the finger.

Further, according to the present invention, a double touch may mean a touch pattern to perform short touches twice consecutively.

A touch operation method according to the present invention may be classified into 7 functions as follows. However, such a classification is merely an exemplary embodiment to be applied to the present invention, and it is thus not limitative to the present invention.

(1) Function for enlarging or reducing a screen (first embodiment)

(2) Function for selecting a separate unit (second embodiment)

(3) Function for selecting a plurality of units (third embodiment)

(4) Function for selecting all units displayed on the screen (fourth embodiment)

(5) Function for selecting the same units which are displayed on the screen, together (fifth embodiment)

(6) Function for designating a troop (sixth embodiment)

(7) Function for designating a screen (seventh embodiment)

Hereinafter, each embodiment of the present invention will be described referring to drawings corresponding thereto respectively.

The First Embodiment

The first embodiment according to the present invention relates to a function for enlarging or reducing a screen.

Figure 3A:
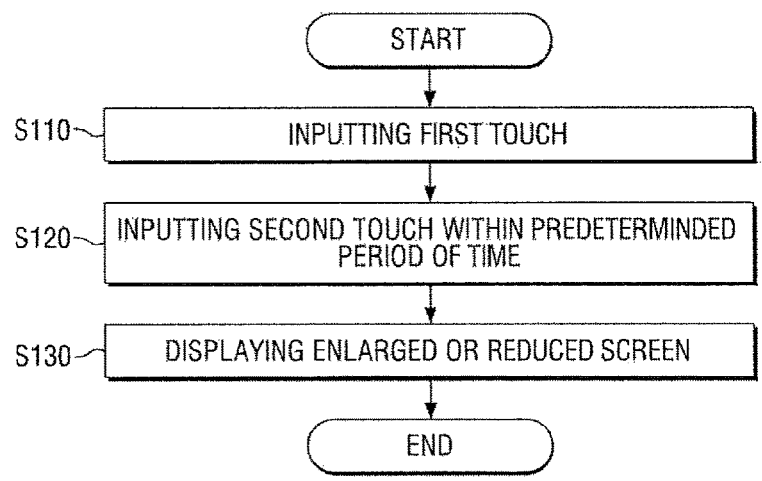
FIG. 3A is a flowchart showing a procedure for enlarging or reducing a screen, according to the present invention
Figure 3B:
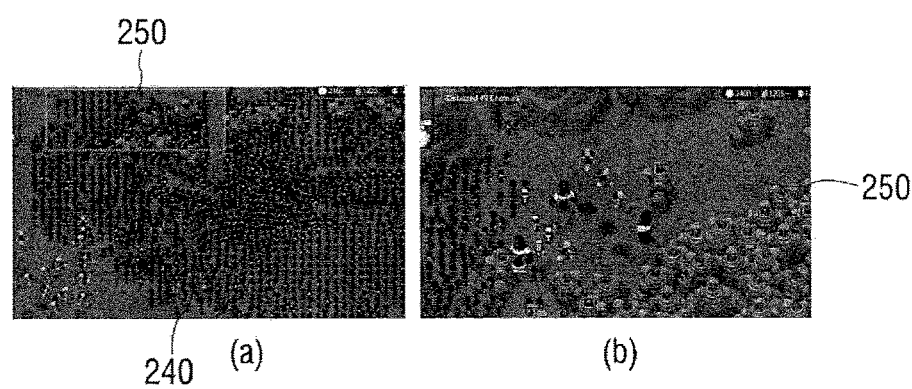
FIG. 3B shows a specific example of a procedure of enlargement or reduction.

With respect to the present invention, FIG. 3A is a flowchart showing a procedure for enlarging or reducing a screen and FIG. 3B shows a specific example of a procedure of enlargement or reduction.

Referring to FIG. 3A, a first touch may be input at step S110.

The first touch input may include any one of a long touch, a short touch, a double touch, etc.

Hereafter, a second touch may be input within a predetermined period of time at step S120.

For example, if the predetermined period of time is 100 ms, the second touch may be input within 100 ms, and the second touch may include a long touch, a short touch, a double touch, etc.

Meanwhile, if the predetermined period of time is 100 ms, a user may substantially feel like to input the first touch and the second touch at the same time.

After step S120, a screen may be enlarged or reduced, allowing being displayed at step S130.

Referring to (a) of FIG. 3B, a partial area 250 of the game screen 240 is illustrated. While going through the steps described in FIG. 3A, the partial area 250 may be enlarged and then displayed like in (b) of FIG. 3b.

Further, when (b) of FIG. 3b is displayed and the steps described in FIG. 3A are then applied thereto, a reduced screen as like (a) of FIG. 3B may be displayed.

Accordingly, the enlarged or reduced screen may be displayed by simply operating user's pointer.

The Second Embodiment

The second embodiment according to the present embodiment relates to a function for selecting a separate unit.

Figure 4A:
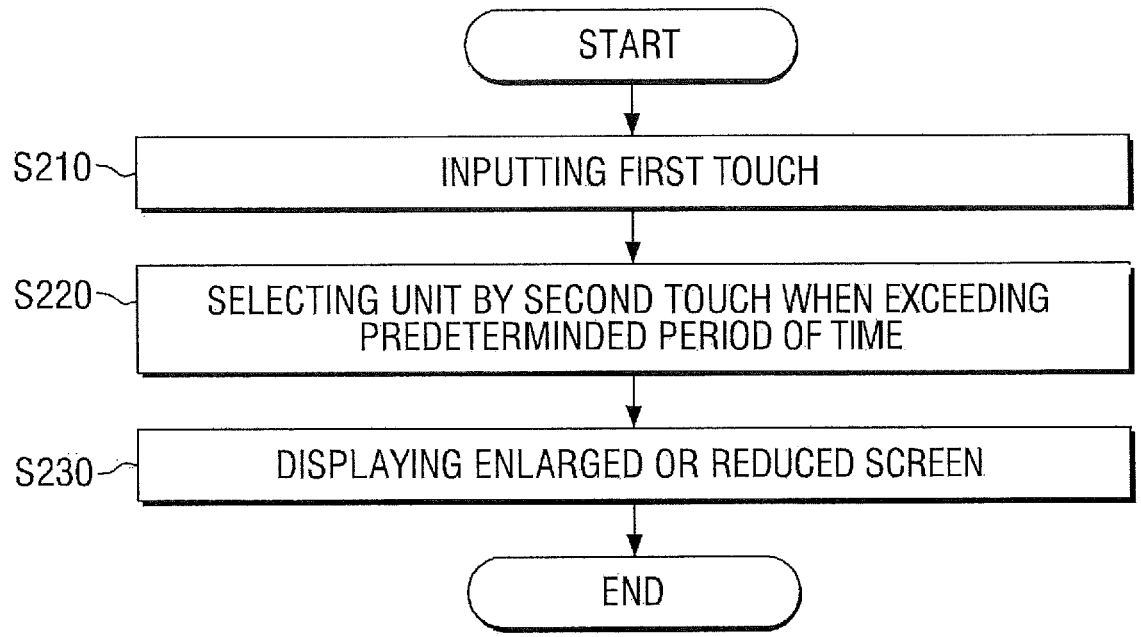
FIG. 4A is a flowchart showing a procedure for selecting an individual unit, according to the present invention
Figure 4B:
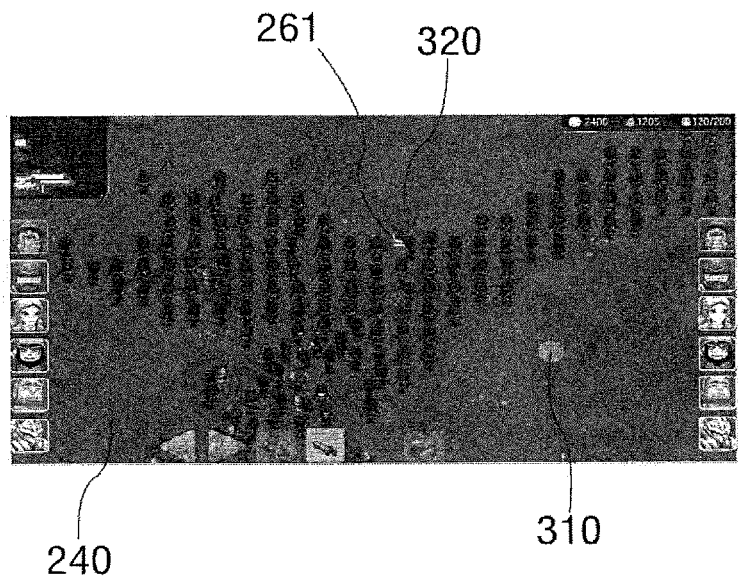
FIG. 4B is a specific example of a procedure for selecting of an individual unit.

With respect to the present invention, FIG. 4A is a flowchart for selecting a separate unit and FIG. 4B is a specific example of a procedure for selecting of an individual unit.

Referring to FIG. 4A, a first touch is input firstly and then maintained until a second touch is input at step S210.

The first touch input may include any one of a long touch, a short touch, a double touch, etc.

Hereafter, the separate unit is selected by a second touch after a predetermined period of time at step S220.

For example, the second touch input may be a short touch input at step S220. However, the present invention is not limited hereto.

That is, a user may select one of the separate unit among 6 units described in FIG. 2A by touching.

For example, if the predetermined period of time is 100 ms, the second touch may be input after 100 ms, the second touch may include a long touch, a short touch, a double touch, etc., all together, and a first unit may be selected among the 6 units.

Typically, the second touch may be the short touch.

After step S220, the user may give a command to the selected separated unit via menu at step S230.

Referring to FIG. 4B, a user may select a point, corresponding to step S210. After the predetermined period of time, the user may select a first unit 261 by a second touch 320.

In this case, the user may give a command for a special duty to the first unit 261.

The Third Embodiment

The third embodiment according to the present invention relates to a function for selecting a plurality of units.

With respect to the present invention, FIG. 5A is a flowchart showing a procedure for selecting a plurality of units, and FIG. 5B shows a procedure for selecting a plurality of units.

Referring to FIG. 5A, a user may input a first touch and then maintain such a touch at step S310.

In a state that the user inputs the first touch as step S310, a second touch may be input when exceeding the predetermined period of time at step S320.

Further, in a state that the user maintains the second touch, a third touch may be input, allowing controlling a selection radius at step S330.

Herein, the third touch input may be a sort of input that controls a radius for selecting a unit through drag of the maintained first touch step S310.

Simultaneously with this, the plurality of units are selected through drag-in of the maintained second touch by a fourth touch at step S340. A unit may be selected within the selection radius chosen via the third touch input corresponding thereto at step S350.

Accordingly, the user may give commands to the selected plurality of units all at once time at step S360.

Referring to (a) of FIG. 5B, in a state that the user inputs the first touch 310, a procedure for inputting the second touch 320 after the predetermined period of time passed is illustrated.

Further, the user may set-up an area for designating a unit through the third touch 330 in a state of maintaining the second touch 320.

Hereafter, as in (b) of FIG. 5B, if selecting the separate unit 262, the plurality of units may be selected together within the chosen selection radius.

Accordingly, the user may designate the plurality of units within a desired range by simply controlling a pointer operation and then transfer a command thereto.

Meanwhile, the terrain may be easily placed by a terrain building tool in the game.

Further, it may be possible to cancel such placement of the terrain through a specific operation.

Figure 5C:
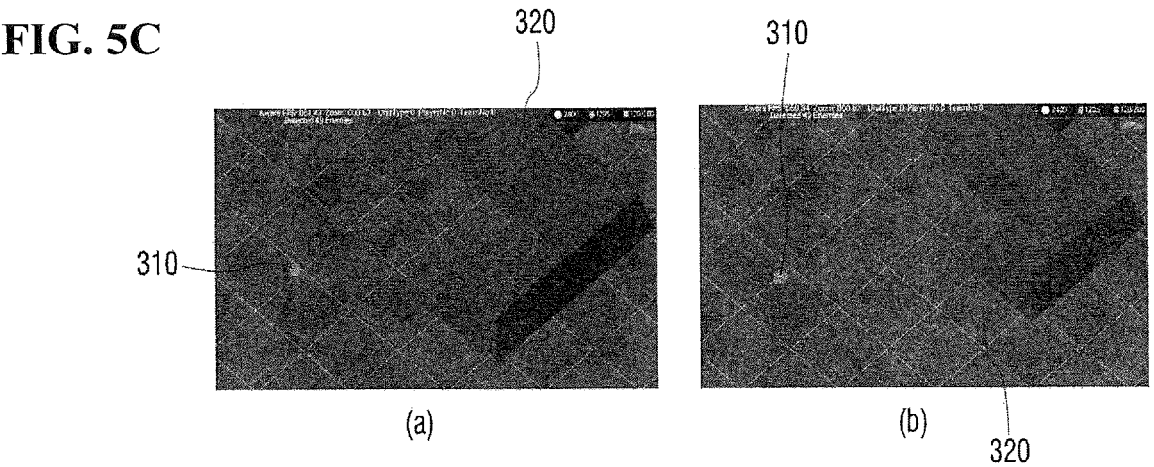

FIG. 5C is a specific example for placing and canceling the terrain by the terrain building tool on the screen.

Referring to (a) of FIG. 5C, after the predetermined period of time passed in a state of inputting the first touch 310, a short touch or drag may be performed as the second touch input 320, at a region where the terrain would be placed.

The terrain may be automatically placed according to this second touch input 320, Further, referring to (b) of FIG. 5C, after the predetermined period of time passed in a state of inputting the first touch 310, when short-touching or dragging the region where the terrain is placed, it may be possible to cancel a placement command that is through (a) of FIG. 5C.

The Fourth Embodiment

The fourth embodiment according to the present invention relates to a function for selecting all units displayed on the screen.

Figure 6A:
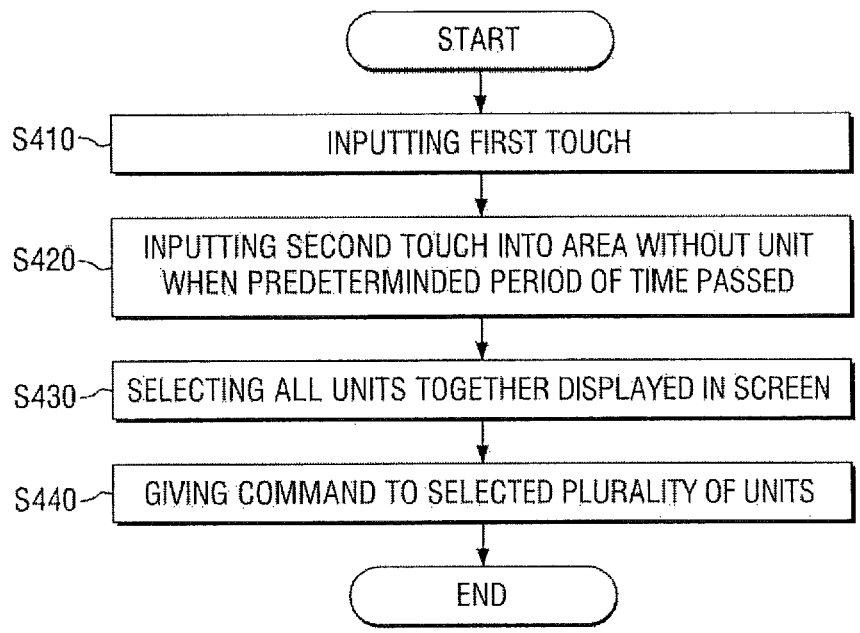
FIG. 6A is a flowchart showing a procedure for selecting all units on a screen, according to the present invention.
Figure 6B:
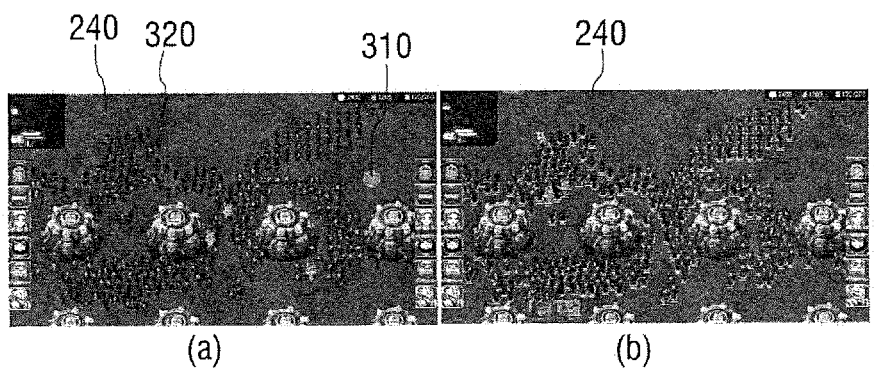
FIG. 6B is a specific example of FIG. 6A.

FIG. 6A is a flowchart showing a procedure for selecting all units on a screen, according to the present invention, and FIG. 6B is a specific example of FIG. 6A.

Referring to FIG. 6A, a user may input a first touch and then maintain such a touch at step S410.

Hereafter, a second touch may be input to an area without units when exceeding the predetermined period of time at step S420.

At this time, all units which are displayed to a user through the game screen 240 in a screen may be selected together at step S430. And the user may give a command to a plurality of units at step S440.

Referring to (a) of FIG. 6B, illustrated is a procedure that a user may input the first touch 310 and then input the second touch 320 to an area without units after a predetermined period of time passed.

Accordingly, as illustrated in (b) of FIG. 6B, all units present in the game screen 240 may be selected and the user may give a command to the designated plurality of units.

Therefore, the user may designate units displayed on the screen at the same time through simple operation and then give a command to the same.

The Fifth Embodiment

The fifth embodiment according to the present invention relates to a function for selecting the same units which are displayed on the screen, together.

Figure 7A:
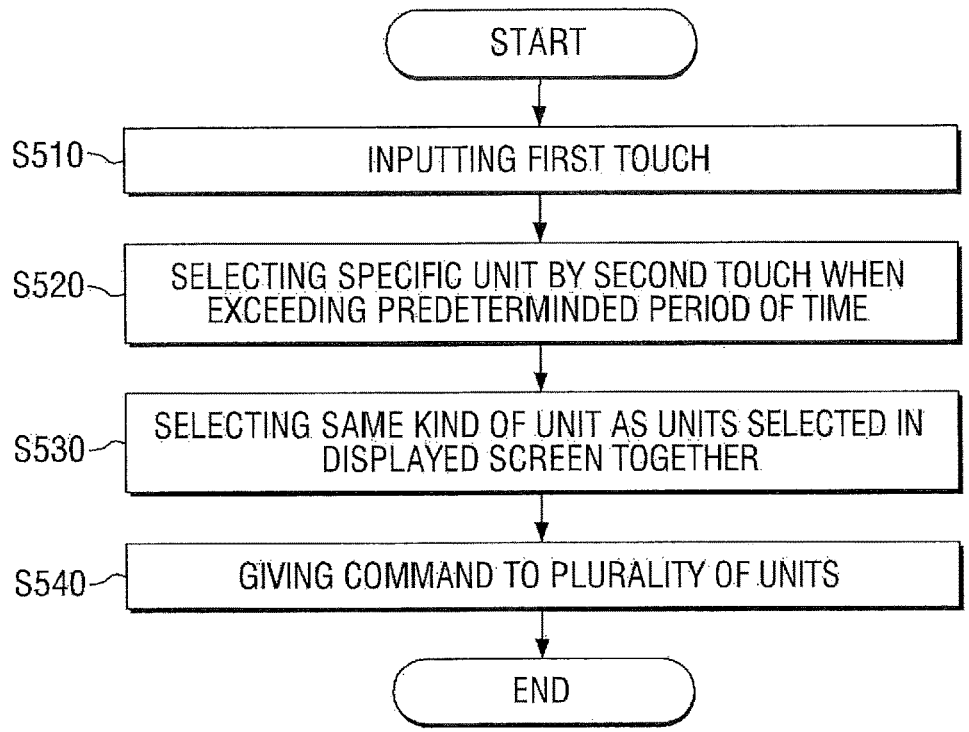
FIG. 7A is a flowchart showing a procedure for selecting the same units displayed on a screen, together, according to the present invention
Figure 7B:
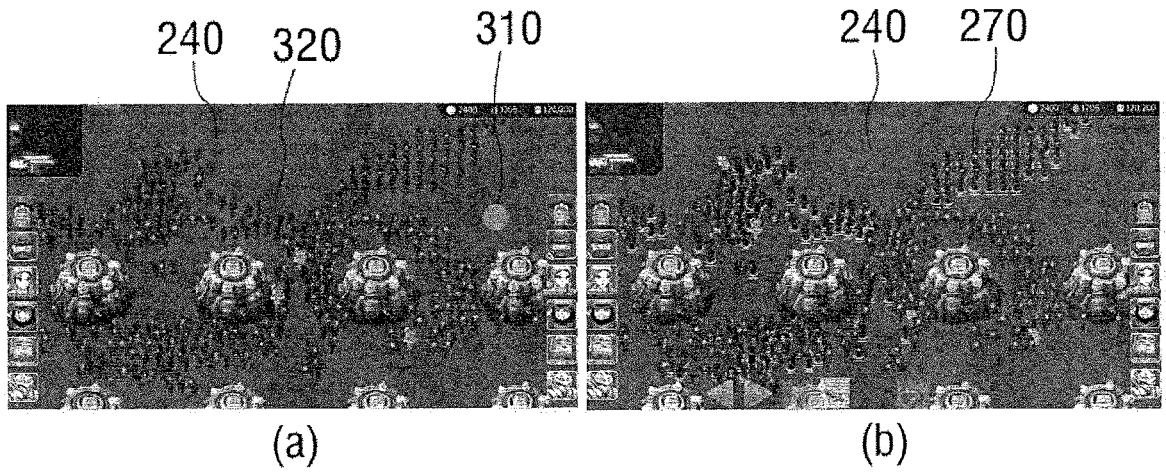
FIG. 7B is a specific example of FIG. 7A.

With respect to the present invention, FIG. 7A is a flowchart showing a procedure for selecting the same units displayed on a screen, together and FIG. 7B is a specific example of FIG. 7A.

Referring to FIG. 7A, firstly, a first touch may be input and then maintained at step S510.

Hereafter, a specific unit may be selected by a second touch when exceeding a predetermined period of time at step S520.

For example, a user may select the specific unit through a long touch or a double touch.

After step S520, the same kind of unit as the unit selected in the displayed screen may be selected together at step S530, and the user may give a command to the selected plurality of units at step S540.

That is, differently from the fourth embodiment, the fifth embodiment may select not all units displayed in the screen but desired units selectively at the same time.

Referring to (a) of FIG. 7B, after the user input the first touch 310, a procedure that the second touch 320 including a specific unit is input after a predetermined period of time passed is illustrated.

Corresponding hereto, as illustrated in (b) of FIG. 7B, only the same kind of units 270 may be selectively selected at the same time.

The Sixth Embodiment

The sixth embodiment according to the present invention relates to a function for designating a troop.

Figure 8A:
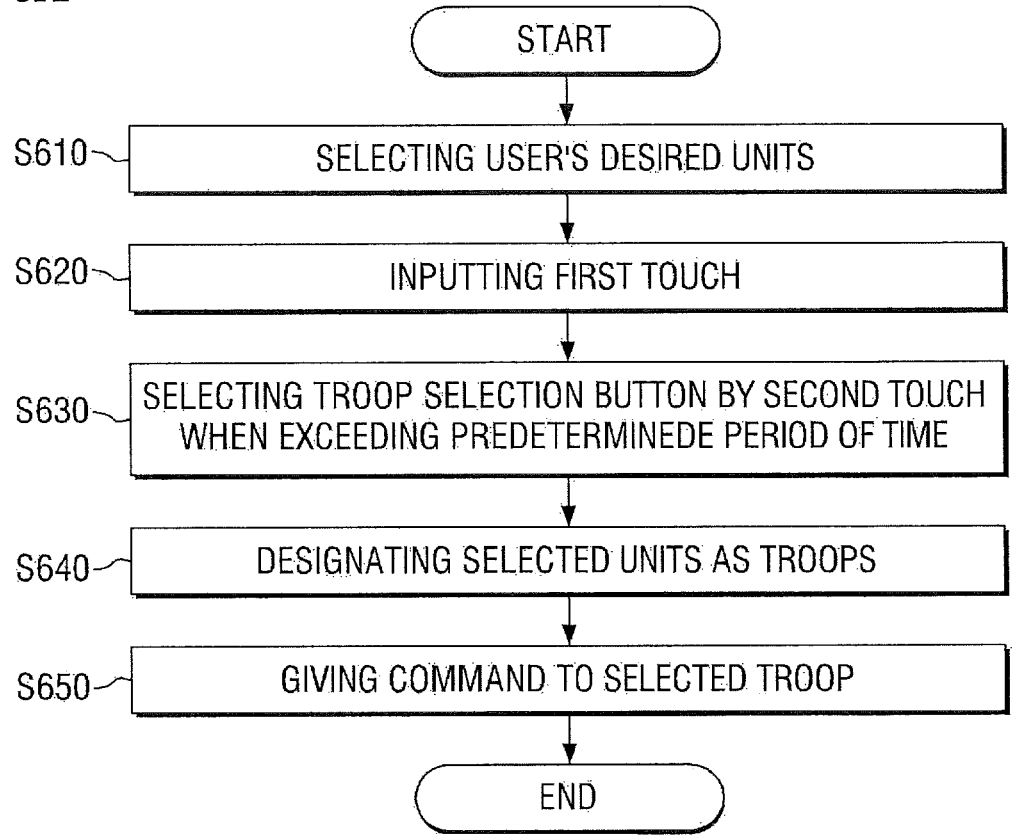
FIG. 8A is a flowchart showing a procedure for designating a troop, according to the present invention.

With respect to the present invention, FIG. 8A is a flowchart showing a procedure for designating a troop, and FIG. 8A is a specific example of a procedure for designating a troop.

Referring to FIG. 8A, firstly, a user may select a desired unit at step S610.

Step S610 may be performed through at least one among steps 1 to step 5 as described above.

Hereafter, the user may input a first touch at step S620. A troop selection menu 210 may be selected by the second touch 320 when exceeding a predetermined period of time at step S630.

Typically, the second touch 320 at step S630 according to the present invention may be the short touch. However the present invention is not limited thereto.

Corresponding hereto, the selected unit 280 may be designated as a troop at step S640, and the user may give a command to the selected troop at step S650.

Differently from the aforementioned embodiments, the sixth embodiment is featured by selecting not the same kind of units or other units present in the screen but a unit according to only user's interest and then designating such a unit as a troop.

Figure 8B:
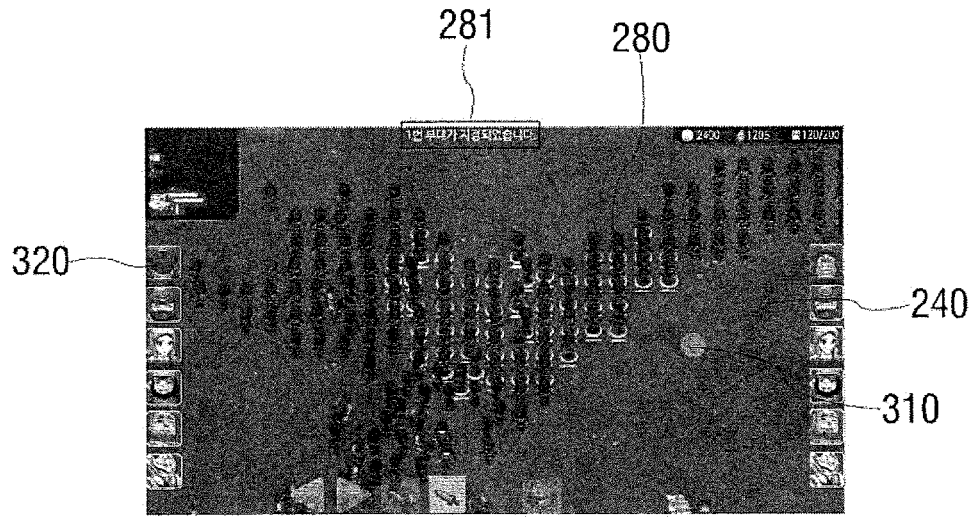
FIG. 8B is a specific example of a procedure for designating a troop.

Referring to FIG. 8B, illustrated is a procedure that the user may select desired units 280 and input the first touch 310, and then the troop selection menu 210 may be selected by the second touch 320. The selected unit is designated as a troop therethrough.

Further, an alarm window 281 may be additionally displayed on a portion of the display unit 151, allowing informing the user of the designation of a troop.

The Seventh Embodiment

The seventh embodiment according to the present invention relates to a function for designating a screen.

Figure 9A:
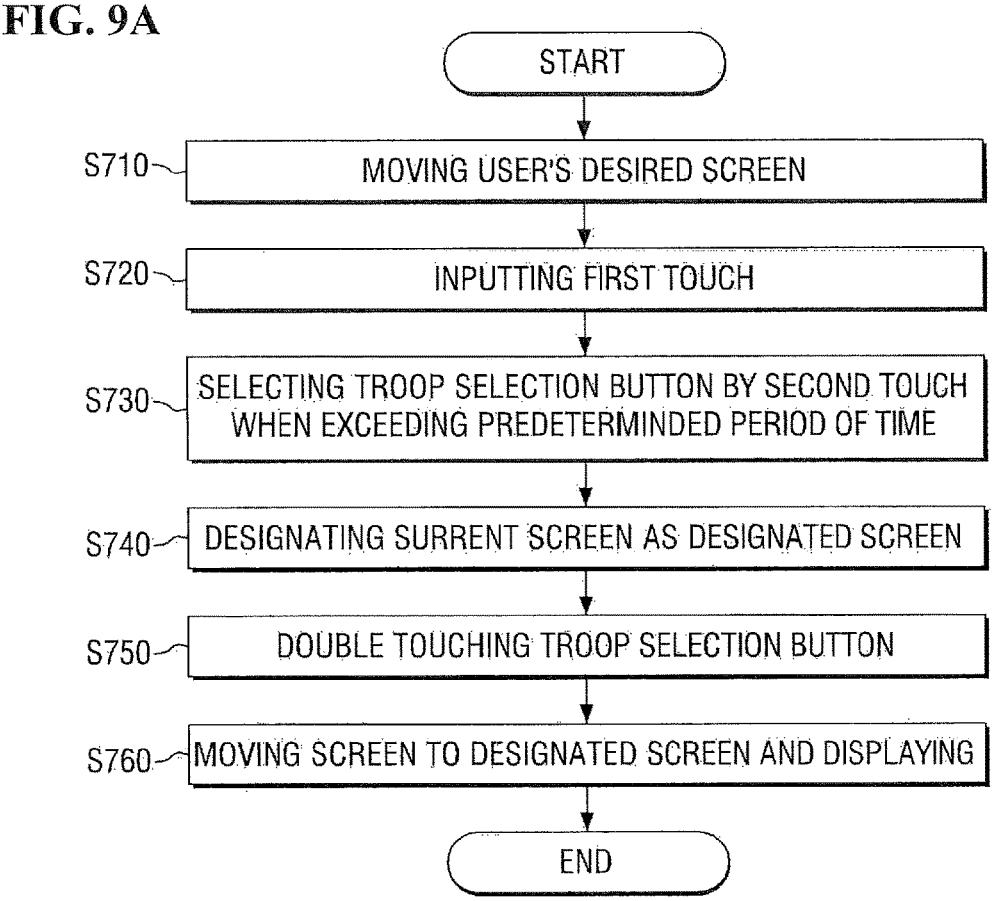
FIG. 9A is a flowchart showing a procedure for designating a screen.

FIG. 9A is a flowchart showing a procedure for designating a screen.

Referring to FIG. 9A, firstly, a user may move to a desired screen at step S710.

Step S710 may be performed through one among the aforementioned first to seventh embodiments.

Hereafter, the user may input a first touch at step S720 and the troop selection menu 210 may be selected by a second touch when exceeding a predetermined period of time at step S730.

Typically, the second touch at step S730 according to the present invention may be the long touch. However the present invention is not limited thereto.

Accordingly, a current screen displayed on the display unit 151 may be designated as a designated screen at step S740. Even if any other screen is displayed at step S750, when the user double touch the troop selection menu 210 at step S760, the screen may be moved to the designated screen and then displayed at step S770.

Figure 9B:
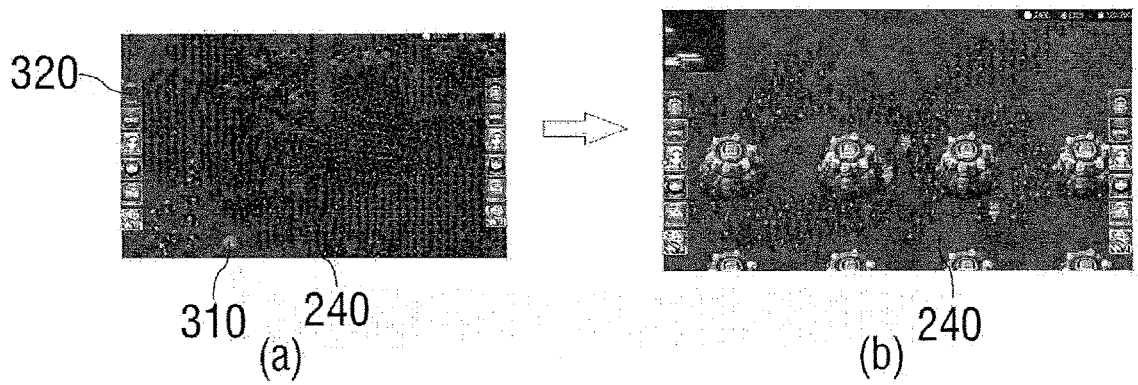
FIG. 9B is a specific example of a procedure for designating a screen.

Referring to (a) of FIG. 9B, illustrated is a procedure that the user may input the first touch on a desired screen at step S720, and the troop selection menu 210 may be selected by the second touch when exceeding the predetermined period of time.

Hereafter, as illustrated in (h) of FIG. 9B, even though any other screen is displayed at step S750, if the user double touches the troops selection menu 210, the screen of (a) of FIG. 9B may be displayed.

Accordingly, the user may move to the desired screen rapidly through simple operation.

When applying the aforementioned configurational elements, the user may be provided with a method for touch control in a mobile real-time simulation game.

Particularly, the user may be provided with a touch control method which can provide a function selected among predetermined functions according to the interval from when a touch has been input to when the next touch is input and the pattern type of input touch.

The embodiments of the present invention as described above may be implemented via a variety of means. For example, the embodiments of the present invention may be implemented via hardware, firmware, software, or combination thereof.

In a case of implementation through hardware, a method according to the embodiments of the present invention may be implemented through one or more of Digital Signal Processing Devices (DSPDs), Programmable Logic Devices (PLDs), Field Programmable Gate Arrays (FPGAs), processors, controllers, micro-controllers, microprocessors, etc.

In a case of implementation through firmware or software, a method according to the embodiments of the present invention may be implemented into a type of a module performing technical functions or operations, a procedure, a mathematical function, etc. A software code may be stored in a memory unit and operated by a processor. The memory unit may be positioned inside or outside the processor, allowing transmitting and receiving data with the processor by publicly known means.

The detailed description of preferable embodiments of the present invention disclosed as the above is provided, allowing being embodied and implemented by those of ordinary skilled in the art. Even though describing referring to preferable embodiments of the present invention in the above, those of ordinary skilled in the art may understand that the present invention may be modified and changed within the scope of the present invention. For example, those of ordinary skilled in the art may use the respective elements described in the aforementioned embodiments by combination thereof. Therefore, the present invention is not limited to the embodiments disclosed herein, but intends to grant the widest scope corresponding to principals and novel features disclosed herein.

The present invention may be embodied in any other specific forms within the scope of the concept and essential features. Therefore, the above detailed description should not be interpreted restrictively in all aspects but considered as examples. The scope of the present invention should be determined by rational interpretation, and all modifications within the scope equivalent to the present invention should be included in the present invention. The present invention is not limited to the embodiments disclosed herein, but intends to grant the largest scope corresponding to principals and novel features disclosed herein. Further, embodiments may be configured by combination of claims which are not explicitly in citation relation with the scope of claimed inventions, or may be included as new claims by amendments after filing an application.

What is claimed is:

1. A touch control method in a simulation game using a plurality of units comprising steps of:
   (a) displaying the simulation game on a display unit;
   (b) inputting a touch of a first pattern into at least a portion of the display unit;
   (c) inputting a touch of a second pattern into at least a portion of the display unit; and
   (d) providing predetermined functions using the interval between the touch input of the first pattern and the touch input of the second pattern and the touch pattern types of the touch input of the first pattern and the touch input of the second pattern, wherein the touch input of the first pattern and the touch input of the second pattern include a long touch input, a short touch input and a double touch input, wherein if the interval is within a predetermined period of time, a specific area of a game screen displayed on the display unit is either enlarged or reduced at step (d), and wherein if the interval exceeds the predetermined period of time, the touch control method is operated at least by any one of the following methods:

when one unit is designated among the plurality of units by the touch input of the second pattern, any one unit among the plurality of units is selected from the game screen displayed on the display unit at step (d);

the second pattern includes the long touch input; step (d) further comprises:

inputting a touch of a third pattern that is a touch-and-drag, so as to designate a range of selection in a state of maintaining the touch input of the second pattern; and selecting all units present within the range of selection among the plurality of units;

the touch input of second pattern is input into an area without the plurality of units in the game screen displayed on the display unit;

all units present in the displayed game screen is selected among the plurality of units at step (d); or any one unit is designated among the plurality of units by the touch input of the second pattern and all units w hich are the same type as the any one unit are selected among the plurality of units from the game screen displayed on the display unit at step (d).

2. The touch control method in a simulation game of claim 1, wherein if the interval exceeds the predetermined period of time, and one unit is designated among the plurality of units by the touch input of the second pattern, any one unit among the plurality of units is selected from the game screen displayed on the display unit at step (d).

3. The touch control method in a simulation game of claim 1, wherein the interval exceeds a predetermined period of time, and step (d) further comprises:

inputting a touch of a third pattern, so as to designate a range of selection in a state of maintaining the touch input of the second pattern; and selecting all units present within the range of selection among the plurality of units.

4. The touch control method in a simulation game of claim 3, wherein the touch input of the third pattern is the touch-and-drag.

5. The touch control method in a simulation game of claim 1, wherein the interval exceeds the predetermined period of time, the touch input of second pattern is input into an area without the plurality of units in the game screen displayed on the display unit, and all units present in the displayed game screen is selected among the plurality of units at step (d).

6. The touch control method in a simulation game of claim 1, wherein the interval exceeds the predetermined period of time, any one unit is designated among the plurality of units by the touch input of the second pattern, and all units which are the same type as the any one unit are selected among the plurality of units from the game screen displayed on the display unit at step (d).

7. The touch control method in a simulation game of claim 1 further comprising step of:

designating a first group which includes at least one of the plurality of units, in advance prior to step (a), wherein the interval exceeds the predetermined period of time, the touch of the second pattern is input into a menu for selecting a troop, the first group is selected as a specific troop at step (d).

8. The touch control method in a simulation game of claim 1 comprising step of:

moving to a first screen in the game screen displayed on the display unit in advance prior to step (a), wherein the interval exceeds the predetermined period of time, the touch of the second pattern is input into the menu for selecting a troop, the first screen is selected as a designated screen at step (d).

9. The touch control method in a simulation game of claim 1, wherein the simulation game is performed by using at least one between a local area communication and telecommunication, wherein the local area communication includes technologies of Bluetooth, Radio Frequency Identification (RFID), Infrared Data Association (IrDA), Ultra Wideband (UWB), ZigBee, and Wireless Fidelity (Wi-Fi), and the telecommunication includes technologies of Code division multiple Access (CDMA), Frequency division multiple access (FDMA). Time Division Multiple Access (TDMA), Orthogonal Frequency Division Multiple Access (OFDMA) and Single Carrier Frequency division Multiple Access (SC-FDMA).

\* \* \* \* \*